Patented Aug. 21, 1945

UNITED STATES PATENT OFFICE 2,383,319

PRODUCTION OF SULPHONYL CHLORIDES

Morris Selig Kharasch, Chicago, Ill., assignor to E. I. du Pont de Nemours & Company, Wilmington, Del., a corporation of Delaware No Drawing. Application August 23, 1939, Serial No. 291,515

8 Claims. (Cl. 204—158)

This invention relates to a new process of forming substitution products containing sulphur, oxygen and chlorine and more particularly to the use of sulphuryl chloride to produce sulphonyl chlorides.

This invention has as an object to provide a new process of forming substitution products containing sulphur, oxygen and chlorine. A further object is to develop a new use for sulphuryl chloride. A still further object is to provide catalysts which enable sulphuryl chloride to react with saturated aliphatic and alicyclic hydrocarbons to produce sulphonyl chlorides. A still further object is to provide a novel and easily conducted process of making sulphonyl chlorides which can be converted into surface active agents by hydrolysis. Other objects will appear hereinafter.

These objects are accomplished by the following invention. Saturated aliphatic and alicyclic hydrocarbons containing a trimethylene radical are reacted with sulphuryl chloride in the presence of actinic light and an organic catalyst, and, if desired in the presence of a solvent, at a suitable temperature. A side reaction may occur in which varying quantities of chlorine may be introduced into the molecule. The sulphonyl chlorides thus formed may then be hydrolyzed either by boiling with water or by treatment with an alkali or an alkaline reagent to yield water soluble sulphonic acids or their salts, or they may be employed without hydrolysis for other purposes.

The following examples illustrate but do not limit the invention. All parts are given by weight.

EXAMPLE I 42 parts of cyclohexane and 33.8 parts of sulphuryl chloride were introduced into a container which was illuminated by a tungsten filament light. 0.2 part of mercapto-thiazoline was added and the reaction mixture was heated to a gentle reflux until no more gas was evolved. The reaction mass was filtered and excess cyclohexane removed by distillation at reduced pressure. After removal of the excess cyclohexane, the residue consisted of a mixture of cyclohexyl chloride (identified by its boiling point) and cyclohexyl sulphonyl chloride (identified by its boiling point and by conversion to its anilide).

EXAMPLE II

In a manner similar to that described in Example I normal heptane was reacted with sulphuryl chloride for one hour at 60–70° C. in the presence of quinoline.

EXAMPLE III 226 parts of cetane and 226 parts of benzene were mixed and heated to 60° C. in the presence of actinic light from a tungsten lamp. One part of pyridine was added to the mixture and 135 parts of sulphuryl chloride was added slowly over a period of 4 hours, maintaining the temperature at 60° C. There was a constant evolution of HCl gas during this time. After this evolution had ceased, the benzene was distilled under reduced pressure, and the crude cetane sulphonyl chloride was hydrolyzed with 30% aqueous caustic soda solution at reflux temperature. The cetane sulphonic acid thus produced contained an average of .117 chlorine atoms per molecule.

EXAMPLE IV 225 parts of a saturated white mineral oil having a specific gravity of 0.805, a boiling range of 284–335° C., a refractive index of 1.447 and a Saybolt viscosity of 40 at 100° F. was mixed with 225 parts of benzene and warmed to 70° C. in the presence of light from a tungsten filament lamp. One part of pyridine was added to the mixture and then 135 parts of sulphuryl chloride was introduced over a period of 4 hours. There was a steady evolution of gas throughout the entire reaction. When this evolution had ceased, the benzene, excess sulphuryl chloride and dissolved gases were distilled under reduced pressure. The crude alkane sulphonyl chloride was hydrolyzed with 30% aqueous caustic soda solution at the reflux temperature. The sulphonic acid thus produced showed surface activity in water solution.

EXAMPLE V 210 parts of a saturated white mineral oil having a specific gravity of 0.803, a boiling range of 265–306° C., a refractive index of 1.444, and a Saybolt viscosity of 38 at 100° F. was mixed with 405 parts of sulphuryl chloride and warmed to 45–50° C. in the presence of actinic light. One part of mercapto-thiazoline was added and the reaction was run for 16 hours. Then an additional 270 parts of sulphuryl chloride and one part of mercapto-thiazoline were added, and the reaction was continued for 4 hours at 45–50° C. When the reaction was complete, the excess sulphuryl chloride was distilled at reduced pressure. The crude alkane sulphonyl chloride was hydrolyzed with 30% aqueous caustic soda solution at reflux temperature. The alkane sulphonic acid thus produced contained 1.34 chlorine atoms per atom of sulphur.

EXAMPLE VI

Two hundred and twenty-five parts of a saturated white mineral oil having a specific gravity of 0.805, a boiling range of 284–335° C., a refractive index of 1.447, and a Saybolt viscosity of 40 at 100° F. and one part of pyridine were mixed and warmed to 70° C. in the presence of light from a tungsten filament bulb. Two hundred and seventy parts of sulphuryl chloride was introduced into the stirred reaction mixture at a constant rate over a period of 4 hours. After 2 hours a second part of pyridine was added. Gas was evolved continuously during the reaction. The reaction mixture was next subjected to a vacuum of about 100 mm. in order to remove unreacted sulphuryl chloride and dissolved gases. The mixture of alkane sulphonyl chlorides was hydrolyzed with 30 per cent aqueous sodium hydroxide solution at the reflux temperature. The product was diluted with water and the undissolved oil was separated. The clear aqueous solution contained a mixture of sodium alkane monosulphonates which analyzed 0.8 atom of chlorine per atom of sulphur. No disulphonates could be detected in the product.

EXAMPLE VII

The procedure described in Example VI was repeated at 22° C. and the sulphuryl chloride was added over a period of 6.5 hours. The yield of the mixture of sodium alkane sulphonates was good. The product contained 0.7 atom of chlorine per atom of sulphur.

EXAMPLE VIII

Two hundred and twenty-five parts of the mineral oil described in Example VI and one part of pyridine were mixed and warmed to 70° C. in the presence of light from a tungsten filament bulb. One hundred and thirty-five parts of sulphuryl chloride was introduced into the stirred reaction mixture at a constant rate over a period of 3.25 hours. The reaction mixture was then processed as described in Example VI. The yield of the mixture of sodium alkane sulphonates was substantially less than that obtained in Example VI. The product contained 0.2 atom of chlorine per atom of sulphur.

EXAMPLE IX

The procedure described in Example VI was repeated using a glass filter to block out ultra-violet light and the sulphuryl chloride was added over a period of 6.5 hours. The yield of the mixture of sodium alkane sulphonates was as good as that obtained in Example VI. The product contained 0.55 atom of chlorine per atom of sulphur. No disulphonates could be detected in the product.

EXAMPLE X

The procedure described in Example VI was repeated using 3.4 parts of triphenyl-phosphine as the catalyst in place of pyridine. The yield of the mixture of sodium alkane sulphonates was good. The product contained one atom of chlorine per atom of sulphur. No disulphonates could be detected in the product.

EXAMPLE XI 225 parts of a saturated white mineral oil having a boiling range of 285–337° C., a refractive index of 1.4473, and a specific gravity of 0.8071, 300 parts of benzene and 1 part of pyridine were treated with 270 parts of sulphuryl chloride in the presence of a tungsten filament lamp. The sulphuryl chloride was added gradually over a period of ten hours, and during the entire period hydrochloric acid gas was evolved continuously. The benzene was removed under vacuum on a steam bath and 316 parts of crude sulphonyl chloride remained. 100 parts of the above crude sulphonyl chloride was hydrolyzed with ten normal sodium hydroxide, and the unreacted oil was separated.

In general, the action of sulphuryl chloride upon a saturated aliphatic or alicyclic hydrocarbon in the presence of actinic light and an organic catalyst as described in the preceding examples will lead to substitution products containing sulphur, oxygen and chlorine if the hydrocarbon contains a trimethylene radical —$CH_2CH_2CH_2$—. This invention embraces the reaction of sulphuryl chloride in the presence of actinic light and an organic catalyst with any saturated hydrocarbon which contains the trimethylene radical and has the general formula, R—$CH_2CH_2CH_2$—R', in which R and R' may represent hydrogen or any saturated hydrocarbon radical.

Hydrocarbons which may be reacted with sulphuryl chloride include saturated aliphatic straight and branched chain hydrocarbons, such as octane, iso-octane, nonane, decane, dodecane, cetane, octadecane, white oils, saturated kerosenes and saturated gasolines. Alicyclic hydrocarbons are also very satisfactory for use in this reaction, and as representative of such hydrocarbons there may be mentioned menthane, naphthenes, camphane, cyclopentane, etc.

The reaction may be carried out over a wide range of temperatures. Since the reaction proceeds best when the saturated aliphatic or alicyclic hydrocarbon and sulphuryl chloride are in the liquid state, temperatures sufficiently low to cause freezing of the reactants are not desired. On the other hand temperatures up to the boiling point of the saturated hydrocarbon or to the decomposition point of the sulphonyl chlorides formed may be used. In general, when operating at higher temperatures it is desirable to provide sufficient pressure to keep the sulphuryl chloride in the liquid state or dissolved in the reaction mixture. The preferred temperature range is 20° to 80° C. and more particularly 40° to 75° C.

The time required for the reaction to run to completion varies within wide limits, depending largely upon the reactivity of the constituents. Usually, less than four hours is sufficient but in some cases sixteen or more hours may be required.

It is preferable to add the sulphuryl chloride slowly to the reaction mixture. Solvents and diluents and preferably inert solvents and diluents such as benzene, carbon tetrachloride, etc. may be used. Thus, in processing saturated hydrocarbons such as waxes which are normally solid at the preferred reaction temperature, the use of an inert solvent is desirable for satisfactory operation. In the case of cyclohexane the use of benzene as a solvent-diluent proved very useful since it retarded concurrent chlorination of the cyclohexane. The reaction may be carried out in the presence of sulphur dioxide or oxygen. The formation of sulphonyl chlorides by the action of sulphuryl chloride is dependent upon the combined influence of an organic catalyst and actinic light. None of the catalysts investigated was active in complete darkness. On the other hand, no sulphonyl chloride was formed when a mineral oil was treated with sulphuryl chloride in the presence of bright light but in the absence of an organic catalyst. Light visible to the human eye is very effective. Light provided by an incandescent tungsten filament is the preferred form of actinic light. The reaction may be run under the influence of the ordinary light of the room, of bright sunlight, of incandescent or arc lamps, of ultraviolet or infrared radiation. Thus clear or frosted electric light bulbs, carbon arcs including metal cored and metal salt cored carbon arcs and ionized vapor or rare gas lamps may be used.

The reaction is catalyzed by a large number of organic compounds. In general the preferred catalysts are completely soluble in the reaction mixture although this property is not an essential requirement. In general organic compounds containing (a) carbon and nitrogen, (b) carbon, nitrogen and oxygen, (c) carbon and phosphorus, and (d) carbon, nitrogen, oxygen and sulphur are the most effective catalysts and are to be preferred. The tertiary nitrogen ring compounds are a preferred class of the carbon and nitrogen group. Organic compounds containing (a) carbon, nitrogen and sulphur, and (b) carbon and oxygen are less preferred groups of catalysts. Organic compounds containing (a) carbon, oxygen and sulphur and (b) carbon and sulphur are the least preferred groups of catalysts. The stated preferences are not intended to be restrictive since the effectiveness of a group of catalysts varies with the type and nature of the saturated hydrocarbon being converted to a sulphonyl chloride and with the reaction conditions. The following compounds will serve to illustrate the various groups of organic catalysts that may be employed in the practice of this invention:

*Carbon and nitrogen compounds*

Pyridine
Quinoline
Quinaldine
Uns.-dimethylethylenediamine
N,N,N',N'-tetramethylhexamethylenediamine
Nicotine
N-dimethyl-C-dimethylglycinenitrile
Hexamethylenediamine
Alpha-aminopyridine
2,6-diaminopyridine
Phenanthroline
Piperidine
Isoquinoline
Octadecylamine
Ethylene diamine
N-dimethyl cyclohexylamine
Dimethylaniline
Tributylamine
Isoamylamine

*Carbon, nitrogen and oxygen compounds*

M-nitrodimethylaniline
Lauramide
N-(p-methoxybenzyl) lauramide
Butyrolactam
Tetramethylammoniumformate
N,N'disalicylaldiaminoethane
N-(2-ethylhexanylidine)-2-ethylhexylamine
2-amino-2-methylpropanol-1
Dodecyl carbamate
Xylylheptadecylketoxime
Hexamethylenediisocyanate
N-dimethylmethoxyacetamide
Isobutylundecylenamide
Nicotinic amide
Acetamide
Morpholine
Stearyldimethylamineoxide
Pyridinium acethydrazide

*Carbon and phosphorus compounds*

Triphenylphosphine

*Carbon, nitrogen, oxygen and sulphur compounds*

(Trimethylaminoethylstearate) methyl sulphate

*Carbon, nitrogen and sulphur compounds*

2-mercaptothiazoline
Methallylisothiocyanate
Allylthiourea
Tetramethyl thiuram disulphide
Tetramethyl thiuram monosulphide

*Carbon and oxygen compounds*

Phenylethyleneoxide

*Carbon, oxygen and sulphur compounds*

Anthraquinone-1-sulphonic acid, potassium salt

*Carbon and sulphur compounds*

Thiophenol

Any apparatus that will withstand the corrosive effect of sulphuryl chloride and HCl gas may be used.

The alkyl sulphonyl chlorides prepared by this method may be converted to the corresponding alkyl sulphonic acids or their salts, which products are useful as surface active agents.

An advantage of this method of preparing sulphonyl chlorides is its low cost, as sulphuryl chloride is cheap and is readily available. A further advantage of this method is that it is a one-step method of preparing alkyl sulphonyl chlorides from aliphatic hydrocarbons. Another advantage of this method is that it facilitates the manufacture of products which contain but one —$SO_2Cl$ group per molecule.

The above description and examples are intended to be illustrative only and not to limit the scope of the invention. Any departure therefrom which conforms to the spirit of the invention and comes within the scope of the appended claims is to be regarded as an embodiment of this invention.

I claim:

1. A process of producing a sulphonyl chloride which comprises reacting a hydrocarbon selected from the group consisting of saturated aliphatic and alicyclic hydrocarbons that contain at least 3 carbon atoms with sulphuryl chloride in the presence of a catalyst and actinic light, and then further reacting the sulphonyl chloride thereby formed.

2. A process of preparing an organic sulphonate which comprises forming a sulphonyl chloride by reacting a saturated aliphatic hydrocarbon that contains at least 3 carbon atoms with sulphuryl chloride in the presence of a catalyst and actinic light and then hydrolyzing the sulphonyl chloride thus obtained.

3. A process of producing a sulphonyl chloride which comprises reacting a hydrocarbon selected from the group consisting of saturated aliphatic and alicyclic hydrocarbons that contain at least 6 carbon atoms with sulphuryl chloride in the presence of a catalyst and actinic light, and then further reacting the sulphonyl chloride thereby formed.

4. A process of preparing an organic sulphonate which comprises forming a sulphonyl chloride by reacting a saturated aliphatic hydrocarbon that contains at least 6 carbon atoms with sulphuryl chloride in the presence of a catalyst and actinic light and then hydrolyzing the sulphonyl chloride thus obtained.

5. A process of preparing an organic sulphonate which comprises forming a sulphonyl chloride by reacting a saturated aliphatic hydrocarbon that contains at least 6 carbon atoms with sulphuryl chloride in the presence of actinic light and a heterocyclic compound containing nitrogen in the ring, and containing no elements other than carbon, hydrogen, nitrogen and oxygen, and then hydrolyzing the sulphonyl chloride thus obtained.

6. A process of preparing an organic sulphonate which comprises forming a sulphonyl chloride by reacting a saturated aliphatic hydrocarbon that contains at least 6 carbon atoms with sulphuryl chloride in the presence of actinic light and pyridine, and then hydrolyzing the sulphonyl chloride thus obtained.

7. A process of preparing an organic sulphonate which comprises forming a sulphonyl chloride by reacting a saturated aliphatic hydrocarbon that contains at least 6 carbon atoms with sulphuryl chloride in the presence of actinic light and 2,6-diamino-pyridine, and then hydrolyzing the sulphonyl chloride thus obtained.

8. A process of preparing an organic sulphonate which comprises forming a sulphonyl chloride by reacting a saturated aliphatic hydrocarbon that contains at least 6 carbon atoms with sulphuryl chloride in the presence of actinic light and morpholine, and then hydrolyzing the sulphonyl chloride thus obtained.

MORRIS SELIG KHARASCH.